United States Patent Office 3,232,968
Patented Feb. 1, 1966

3,232,968
PROCESS FOR PREPARING N-ACYL TAURATES USING HYPOPHOSPHOROUS ACID AS CATALYST
Leslie M. Schenck, Mountainside, and Leslie G. Nunn, Jr., Metuchen, N.J., assignors to General Aniline & Film Corporation, New York, N.Y., a corporation of Delaware
No Drawing. Filed Dec. 1, 1959, Ser. No. 856,333
10 Claims. (Cl. 260—401)

This invention relates to improvements in the production of amide type anionic surface active agents, and more particularly to an improved process for preparing carboxylic acid amides of 2-aminoalkane sulfonic acids.

The reaction of carboxylic acid chlorides with 2-aminoethane sulfonic acid in the presence of an acid neutralizer such as caustic soda to produce the corresponding amides is well known and is described for example in U.S. Patent 1,932,180 and other patents. The preparation of the acid chloride employed as a reactant is not only hazardous but time consuming and costly, since it employs phosphorus trichloride and introduces at least one additional manufacturing step. In addition, a considerable quantity of salt is concurrently produced which is highly undesirable in many uses particularly when the resulting acyl tauride is employed in detergent and built soap formulations. Further, the salt in such formulations imparts thereto an unduly high hygroscopicity and its removal is expensive.

The reaction of 2-aminoalkane sulfonic acids with free carboxylic acids would of course eliminate a number of the above mentioned disadvantages, and processes employing such a reaction have in fact been proposed. Thus, in order to overcome these shortcomings, it has been heretofore proposed to obtain a salt-free product by condensing presumably one mole of a free fatty acid with one mole of a taurine salt, but no additional advantage was found over the acid chloride method. As a matter of fact, it was found that considerable taurine decomposition occurred, a separation of ammonia or methylamine from the taurine was unavoidable, and the yield and quality of the products (odoriferous and discolored) were not as had been hoped for.

In U.S. Patents 2,857,370 and 2,880,219, processes are disclosed for the reaction of one mole of a 2-aminoalkane sulfonic acid salt with at least one mole of the carboxylic acid, optionally in the presence of a boron-containing compound. Although these processes are highly advantageous in eliminating the problem of removal of excess salt and for various other reasons, they are still somewhat plagued with the problems of undue color degradation of the product and/or yields not as high as desired and/or the necessity of employing relatively high reaction temperatures at which degradation and other undesirable side reactions tend to occur.

It is an object of this invention to provide a process for preparing a carboxylic acid amide of a 2-aminoalkane sulfonic acid which will not be subject to the above disadvantages. Another object of this invention is the provision of an improved process for producing such amides at lower reaction temperatures and/or higher yields and/or with decreased formation of colored by-products. Other objects and advantages will appear as the description proceeds.

The attainment of the above objects is made possible by our discovery that when the reaction between the carboxylic acid and the taurine acid salt is carried out in the presence of a catalytic amount of hypophosphorous acid or a salt thereof, lower reaction temperatures may be employed and/or higher yields may be obtained and/or a highly improved, colorless product is obtained. Absence of color is of course highly important and critical in certain uses and the production of colorless products has hitherto required relatively costly purification procedures. Such procedures may be eliminated by use of the process of this invention.

This invention accordingly comprises a process comprising admixing at least one mole of an acylating agent selected from the group consisting of free aliphatic and alicyclic monocarboxylic acids of at least 8 carbon atoms with a catalytic amount of a compound selected from the group consisting of hypophosphorous acid and its salts, and then adding one mole of a taurine salt of the formula HR'N—CHR—CHR—SO$_3$M wherein R' is selected from the group consisting of H and hydrocarbon radicals of 1 to 20 carbon atoms, R is selected from the group consisting of H and lower alkyl, and M is a cation selected from the group consisting of alkali metals and alkaline earth metals, and heating the resulting mixture at a temperature of about 140–320° C. while removing the water formed during the reaction.

When an excess of carboxylic acid is employed in the present process, the final product will inherently contain some free carboxylic acid which may if desired be removed by common extraction or superheated steam distillation procedures. However, a further advantage of this process, in common with the processes disclosed in U.S. 2,857,370 and 2,880,219 resides in the fact that the excess carboxylic acid may be neutralized in situ with an inorganic or organic base such as the alkali metals or amines such as triethanolamine or the like, to produce the corresponding soap in situ. The resulting mixture of soap and N-higher acyl taurine salt may be employed either directly or after addition of other ingredients in the production of detergent compositions and other surface active compositions in liquid or solid form. The use of such compositions in the formation of solid detergent compositions in particulate or bar form is exceedingly advantageous. These compositions may also be employed in the production of skin creams, lotions, salves, and in food products as foaming agents in addition to other uses in which the presence of a mineral acid salt of an alkali metal, alkaline earth metal, ammonium or amine is undesirable.

The duration of the reaction is generally inversely proportional to the temperature employed, the rate of reaction increasing as the temperature increases. However, at higher temperatures, there is a tendency towards the formation of colored by-products and the like while at unduly low temperatures the reaction is too slow for practical purposes. The process of this invention, as pointed out above, permits the reaction to proceed at lower temperatures than hitherto possible although of course the temperature employed in any particular instance will be dependent upon the particular acid employed, the degree purity of product desired, the rate of reaction desired, the catalytic materials present, and the like. In general temperatures of about 140–320° C. define the extreme practical limits of operation, a range of about 160–230° C. yielding excellent results in most instances. At temperatures within the aforementioned ranges, the reaction is usually complete in about 10 hours although the duration required for completion of the reaction may range in any particular instance from about 15 seconds to 15 hours.

It is another advantage of this invention that an inert atmosphere such as nitrogen, carbon dioxide or vacuum need not be employed, and the reaction may be carried out in air or even at super-atmospheric pressures. However, it is usually preferred for optimum results to carry out the reaction in the presence of an inert atmosphere which may be maintained, for example, by use of sub-atmospheric pressures or an inert gas or vapor such as nitrogen, carbon dioxide, or saturated or superheated steam, the gas or vapor being preferably passed in continuous manner through and/or over the reaction mixture to assist in removal of the water formed during the reaction.

The use of at least one mole of the carboxylic acid acylating agent per mole of taurine salt (1:1 minimum molar ratio) is essential for the attainment of the desired results. In general, proportions of about 1.2 to 2.5 moles of the acid per mole of taurine salt have been found sufficient in most instances, although up to 6 to 10 moles or more of the acid may be employed where a product containing a higher free carboxylic acid content is desired. However, any increase in the amount of excess carboxylic acid employed in the reaction mixture, while to some extent aiding in fluidizing and stabilizing the reaction, at the same time tends to increase the cost of the product due to greater heat requirements and increased carboxylic acid losses.

As carboxylic acid acylating agents of at least 8 carbon atoms which may be employed in the instant invention, those preferred are of the aliphatic or alicyclic type although aromatic acids may be used. Particularly preferred are the higher fatty acids of at least 8 carbon atoms. As representative of higher aliphatic and alicyclic carboxylic acids operative in the instant invention, there may be mentioned caprylic acid, pelargonic acid, capric acid, lauric acid, myristic acid, palmitic acid, stearic acid, oleic acid, ricinoleic acid, linoleic acid, undecylenic acid, tall oil acid, acid mixtures from various natural plant and animal oils such as olive, tallow, castor, peanut, coconut, soybean, cotton seed, ucahuba, linseed, cod, herring, menhaden, neat's-foot, sperm, palm, corn, butter, babassu, kapok, hempseed, mustard, rubberseed, rape, safflower, sesame, acids from the oxidation fractions of petroleum and from oxo-aldehydes, naphthenic acids, abietic acids, and the hydrogenated derivatives of such acids and acid mixtures. Other acids which may be employed include alkyl benzoic acids such as dodecyl benzoic acid, nonyl benzoic acid, octyl benzoic acid, alkyl naphthoic acids such as nonyl naphthoic acid, and the like.

In the formula given above for the taurine salts operative in the instant invention, R may represent hydrogen, methyl, ethyl, isopropyl or the like: $R^1$ may represent either hydrogen or a hydrocarbon radical of 1 to 20 carbon atoms such as methyl, ethyl, isopropyl, butyl, heptyl, isooctyl, dodecyl, pentadecyl, stearyl, abietinyl, oleyl, cyclohexyl, phenyl, or the like, and M may represent an alkali metal such as sodium, potassium, or lithium, an alkaline earth metal such as calcium, magnesium, barium or the like, or a tertiary or hindered amine such as dicyclohexyl amine, tributyl amine, trioctyl amine, triethanolamine, N,N-diphenyl methylamine, N,N-dimethyl octadecylamine, tetrahydroxyethyl-ethylene diamine, or the like. Thus, by way of example only, the following specific 2-aminoalkane sulfonic acids may be employed in the form of their salts with a salt-forming group having one of the values given above for M: turine, ditaurine, N-methyl taurine, 2-methyl taurine, N-ethyl taurine, N-propyl taurine, N-isopropyl taurine, N-butyl taurine, N-isobutyl taurine, N-tertiary butyl taurine, N-amyl taurine, N-hexyl taurine, N-cyclohexyl taurine, N-phenyl taurine, N-methyl-2-methyl taurine, N-methyl-2-ethyl taurine, N-methyl-1,2-dimethyl taurine, N-octyl taurine, N-dodecyl taurine, N-stearyl taurine, and the like. The taurine salts are preferably employed in the form of dried powders, but they may also be employed as aqueous solutions since the water is removed during the reaction.

An essential feature of this invention resides in the addition to the reaction medium of a catalytic amount of hypophosphorous acid or a salt thereof. Generally, about 0.1 to 10% and preferably about 0.3 to 1.5% of such acid or salt, based on the weight of the carboxylic acid acylating agent is sufficient to provide the desired improvements in lower reaction temperatures and/or prevention of color degradation of the product and/or increased yields and the like. Hypophosphorous acid and its alkali metal salts, e.g. sodium and potassium salts are generally preferred although any metal (including alkali metal and alkaline earth metal), ammonium or amine salt of the hypophosphorous acid may be employed. These salts may be employed in their hydrated or dehydrated form. As examples of such salts, there may be mentioned aluminum, cadmium, sodium, potassium, lithium, calcium, strontium, barium, magnesium, ammonium, mono-, di-, and tri-methylamine, -ethylamine, -propylamine, -ethanolamine and -propanolamine, pyridinyl, and morpholinyl hypophosphites. When hypophosphorous acid is employed, it is preferred to use a 10 to 70% aqueous solution thereof.

As defined above, the process of this invention calls for admixture of the hypophosphorous acid compound with the acylating agent followed by addition of the taurine salt. It has been unexpectedly found that this procedure is essential for the attainment of optimum results herein. When the hypophosphorous acid compound was first admixed with the taurine salt as such or in aqueous solution and the resulting mixture added to the carboxylic acid acylating agent, the reaction was somewhat accelerated, but maximum prevention of color degradation and maximum conversion of the taurine salt to the desired amide (N-higher acyl taurine salt), was not attained. In carrying out the process of this invention, it is preferred to first dissolve the hypophosphorous acid compound in the molten carboxylic acid acylating agent followed by addition of the taurine salt as a solution, slurry or powder.

The inhibition of color formation in the product by the addition of hypophosphorous acid or its salts is entirely unexpected and very surprising based on other experimental data. In heat stability tests, fatty acids with an initial VCS (Varnish Color Scale, Gardner Scale, Standards of 1933) of 1 were admixed with, respectively, 1% of sodium hypophosphite and 1% of hypophosphorous acid and subjected to temperatures of 160° C. for 6 hours. The treated samples as well as untreated controls showed the same degree of color degradation, namely a VCS of 9. Similarly, when 30% aqueous solutions of sodium N-methyl taurate both untreated and treated by addition of 1% by weight of hypophosphorous acid or sodium hypophosphite, were evaporated to dryness at 140–180° C., the treated samples were of no lighter color than the controls. Further, when, instead of hypophosphorous acid or its salts, the present reaction was carried out with additions of 1 to 1.5% by weight of the fatty acid of other strong reducing agents, including titanous chloride ($TiCl_3$), hydroxylamine, stannous chloride, cobaltous chloride, sodium sulfite, sodium bisulfite, sodium meta arsenite ($NaAsO_2$), and zinc dust, no beneficial effects on the color of the products were obtained. In fact a product darker than the control was obtained in each case, and no acceleration of the reaction was noted.

The products of this invention may be employed in a multitude of uses wherever an anionic surface active agent is called for, including the uses referred to in U.S. 2,880,219, column 5, line 30 to column 6, line 45.

The following examples are illustrative of the present invention and are not to be regarded as limitative. All parts and proportions referred to herein and in the appended claims are by weight unless otherwise indicated.

Example 1

(A) Into a 1-liter electrically heated glass fusion pot fitted with an agitator, thermometer, dropping funnel, distillation condenser and inlet for inert gas is charged 300 g. tallow fatty acid (1.05 moles, M.W. 285):

The charge is heated to 60° C. to melt, nitrogen is passed over the surface of the charge, and there is added 8 g. 50% hypophosphorous acid (4 g. 100%=1.33% by weight of fatty acid charge):

The reaction mixture is heated to 200° C., and there is added dropwise over 1½ hours at 200–205° C. 316 g. of a 37.6% aqueous solution of sodium-N-methyltaurate (0.74 mole, M.W. 161) while distilling off water and a small amount of entrained fatty acid.

Upon completion of the addition, the reaction mixture is heated to 210° C. over fifteen (15) minutes, and held at 210° C. for three (3) hours while removing water. Upon cooling, there is obtained 396 g. of an admixture analyzing 76.4% (302 g.) as N-tallow acid-N-methyl sodium taurate (M.W. 428), 12.7% tallow fatty acid and 7.8% fatty matter. This represents a yield of 95.6% of the theoretical based on the sodium-N-methyl taurate charged. The A.P.H.A. color of a 2.5% solution of the product is 10.

(B) As a control, the identical operation as in 1A is repeated with the exception that the 1.33% by weight of hypophosphorous acid is eliminated.

There is obtained 405 g. of an admixture analyzing 59.8% (242 g.) as N-tallow acid-N-methyl sodium taurate, 23.5% tallow fatty acid and 9.2% fatty matter. This represents a yield of 76.5% of the theoretical based on the sodium-N-methyl taurate charged. The A.P.H.A. color of a 2.5% solution of the product is 80.

(C) Operating as in 1A, with the substitution of 1.33% by weight of sodium hypophosphite for the hypophosphorous acid, based on the weight of tallow fatty acid charged, there is obtained 388 g. of an admixture analyzing 73.8% (286 g.) as N-tallow acid N-methyl sodium taurate, 15.2% as tallow fatty acid and 5.3% fatty matter. This represents a yield of 90.5% of the theoretical based on the N-methyl sodium taurate charged. The A.P.H.A. color of a 2.5% solution of the product is 30.

(D) Operating as in 1A, but using 0.33% by weight hypophosphorous acid instead of 1.33% by weight hypophosphorous acid based on the tallow fatty acid charged, there is obtained 394 g. of an admixture analyzing 74.8% as N-tallow acid N-methyl sodium taurate (293 g.) representing 93.2% of the theoretical conversion of the N-methyl sodium taurate charged to the desired acyl taurate. The A.P.H.A. color of a 2.5% solution of the product is 15.

(E) Operating as in 1C, with the exception that the 4 g. sodium hypophosphite is added to the sodium-N-methyl taurate solution rather than to the fatty acid, there is obtained 389 g. product analyzing 72.0% of N-tallow acid N-methyl sodium taurate (290 g.), representing 88.3% of the theoretical conversion of the sodium N-methyl taurate charged to the desired product. The A.P.H.A. color of a 2.5% solution of the product is 60.

Example 2

(A) Using the equipment and sequence of admixture described in Example 1A, an admixture of 300 g. (1.43 moles, M.W. 210) *coconut fatty acid,* 1.5 g. hypophosphorous acid and 131.2 g. dry sodium N-methyl taurate (0.817 mole, M.W. 161) is heated at 190–195° C. for four (4) hours. The product, 407 g., analyzes 67.9% (276 g.) as N-cocoacid-N-methyl sodium taurate (M.W. 353), representing a yield of 95.7% of the theoretical based on the sodium-N-methyl taurate charged. The A.P.H.A. color of a 2.5% solution of the product is 15.

(B) Operating the identical experiment described in Example 2A, with the exception that the hypophosphorous acid is eliminated from the reaction mixture, there is obtained 403 g. of an admixture analyzing 62% (250 g.) as N-cocoacid-N-methyl sodium taurate, representing a yield of 86.6% of the theoretical based on the sodium-N-methyl taurate charged. The A.P.H.A. color of a 2.5% solution of the product is 95.

Example 3

(A) Using the equipment described in Example 1A, 256 g. (1 mole) palmitic acid and 2.56 g. hypophosphorous acid are heated to 200° C., and a solution of 110 g. (0.75 mole) sodium taurate dissolved in 200 g. water is added over two (2) hours, allowing the vapors to escape to the atmosphere. When the addition is complete, the reaction is held at 200° C. an additional two (2) hours. The product, 341 g., analyzes 76.9% as sodium-N-palmitoyl taurate (M.W. 385). This represents 91% of the theoretical yield based on the sodium taurate charged. The A.P.H.A. color of a 2.5% solution of the product is 10.

(B) As a control, Example 3A is repeated without the addition of 2.56 g. hypophosphorous acid. The product, 343 g., analyzes 61.8% as sodium-N-palmitoyl taurate. This represents 73.5% of the theoretical yield based on the sodium taurate charged. The A.P.H.A. color of a 2.5% solution of the product is 55.

This invention has been disclosed with respect to certain preferred embodiments and various modifications and variations thereof will become obvious to persons skilled in the art. It is to be understood that such modifications and variations are to be included within the spirit and scope of this invention.

We claim:

1. A process comprising admixing at least one mole of an acylating agent selected from the group consisting of free aliphatic and alicyclic monocarboxylic acids of from 8 to 22 carbon atoms with a catalytic amount of hypophosphorous acid, and then adding one mole of a taurine salt of the formula HR'N—CHR—CHR—SO$_3$M wherein R' is selected from the group consisting of H, cyclohexyl, abietinyl, phenyl, and aliphatic hydrocarbon radicals of 1 to 20 carbon atoms, R is selected from the group consisting of H and lower alkyl, and M is a cation selected from the group consisting of alkali metals and alkaline earth metals, and heating the resulting mixture at a temperature of about 140 to 320° C. while removing the water formed during the reaction.

2. A process as defined in claim 1 wherein the acylating agent is a fatty acid.

3. A process as defined in claim 1 wherein the taurine salt is the sodium salt of N-methyltaurine.

4. A process as defined in claim 1 wherein the taurine salt is the sodium salt of taurine.

5. A process as defined in claim 1 wherein about 1.2 to 2.5 moles of the acylating agent are heated with one mole of the taurine salt.

6. A process as defined in claim 1 wherein the temperature is about 160 to 230° C.

7. A process comprising admixing at least one mole of a fatty acid of from 8 to 22 carbon atoms with a catalytic amount of hypophosphorous acid and then adding one mole of a sodium taurate and heating the resulting mixture at a temperature of about 140 to 320° C. while removing the water formed during the reaction.

8. A process as defined in claim 7 wherein the temperature is about 160–230° C.

9. A process as defined in claim 7 wherein said compound is employed in an amount ranging from about 0.3 to 1.5% by weight of the fatty acid.

10. A process for the preparation of a fatty acyl taurate comprising admixing a fatty acid having from 8 to 18 carbon atoms with a catalytic amount of hypophosphorous acid and then adding a taurine salt having the formula:

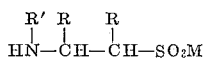

where R' is selected from the group consisting of H, cyclohexyl, abietinyl, phenyl, and aliphatic hydrocarbon radicals of 1 to 20 carbon atoms, R is selected from the group consisting of H and lower alkyl, and M is a cation selected from the group consisting of alkali metals and alkaline earth metals and heating the resulting mixture at a temperature to effect reaction.

References Cited by the Examiner

UNITED STATES PATENTS 3,150,156  9/1964  Lamberti _____ 260—401

CHARLES B. PARKER, *Primary Examiner.*

ABRAHAM H. WINKELSTEIN, *Examiner.*